(12) United States Patent
Rai

(10) Patent No.: US 12,079,296 B2
(45) Date of Patent: Sep. 3, 2024

(54) SYSTEM AND METHOD FOR PERSONALIZED MESSAGES VIA A PHYSICAL MEDIUM WITH A UNIQUE CODE

(71) Applicant: Mandip Singh Rai, Stockton, CA (US)

(72) Inventor: Mandip Singh Rai, Stockton, CA (US)

(*) Notice: Subject to any disclaimer, the term of this patent is extended or adjusted under 35 U.S.C. 154(b) by 0 days.

(21) Appl. No.: 17/674,095

(22) Filed: Feb. 17, 2022

(65) Prior Publication Data

US 2022/0261455 A1 Aug. 18, 2022

Related U.S. Application Data

(60) Provisional application No. 63/150,463, filed on Feb. 17, 2021.

(51) Int. Cl.
| | |
|---|---|
| *G06K 19/06* | (2006.01) |
| *G06F 16/909* | (2019.01) |
| *G06F 16/955* | (2019.01) |
| *G06F 16/958* | (2019.01) |
| *G06K 19/02* | (2006.01) |
| *G06K 19/04* | (2006.01) |

(52) U.S. Cl.
CPC ........ *G06F 16/9554* (2019.01); *G06F 16/909* (2019.01); *G06F 16/958* (2019.01); *G06K 19/027* (2013.01); *G06K 19/041* (2013.01); *G06K 19/06037* (2013.01)

(58) Field of Classification Search
CPC .................. G06F 16/9554; G06K 19/06037
USPC .................................................. 235/487, 494
See application file for complete search history.

(56) References Cited

U.S. PATENT DOCUMENTS

| | | | | |
|---|---|---|---|---|
| 8,651,370 | B1* | 2/2014 | Mudrick | G06Q 30/0239 235/375 |
| 2013/0018726 | A1* | 1/2013 | Ionescu | G06Q 30/00 705/26.1 |
| 2013/0036635 | A1* | 2/2013 | Mayer | G09F 9/30 40/124.06 |
| 2013/0043302 | A1* | 2/2013 | Powlen | G06Q 50/01 235/494 |
| 2013/0282714 | A1* | 10/2013 | Lathrom | G06F 16/955 707/E17.014 |
| 2014/0117076 | A1* | 5/2014 | Eberlein | G06F 16/9566 235/375 |

(Continued)

*Primary Examiner* — Paultep Savusdiphol
(74) *Attorney, Agent, or Firm* — My Patent Guys; Christopher Pilling

(57) ABSTRACT

A system and method for personalized messages via a physical medium are provided. The method includes steps: (a) providing a physical medium having a unique code; (b) scanning, via a camera on a first smartphone, the unique code; (c) accessing, via a display on the first smartphone, a webpage prompted by the scanning of the unique code; (d) enabling a first user to add personalized content to the webpage via the first smartphone display; (e) scanning, via a camera on a second smartphone, the unique code; and, (f) accessing, via a display on the second smartphone, the webpage prompted by the scanning of the unique code such that the personalized content can be viewed by a second user. The system is enabled such that the webpage is only accessible from the uniform resource locator via scanning the unique code with the camera on the smartphone. The webpage may be part of a social media platform.

6 Claims, 4 Drawing Sheets

(56) References Cited

U.S. PATENT DOCUMENTS

| | | | |
|---|---|---|---|
| 2014/0203085 A1* | 7/2014 | Park | G06F 16/9554 |
| | | | 235/494 |
| 2016/0196484 A1* | 7/2016 | Ciavatta | G06K 19/06037 |
| | | | 235/462.1 |
| 2016/0277405 A1* | 9/2016 | Weller | H04L 63/20 |
| 2019/0261042 A1* | 8/2019 | Ramadorai | H04N 21/4622 |
| 2021/0350425 A1* | 11/2021 | Alfia | G06F 16/9554 |
| 2022/0414251 A1* | 12/2022 | Wechsler | G06F 21/6218 |

\* cited by examiner

SYSTEM AND METHOD FOR PERSONALIZED MESSAGES VIA A PHYSICAL MEDIUM WITH A UNIQUE CODE

CROSS-REFERENCE TO RELATED APPLICATIONS

The present invention claims priority to provisional application Ser. No. 63/150,463 filed Feb. 17, 2021 which is incorporated herein at least by reference.

BACKGROUND OF THE INVENTION

1. Field of the Invention

The present invention relates generally to personalized messages but more particularly to a system and method for a personalized message via a physical medium.

2. Description of Related Art

There are three forms of greeting card invitations: physical, electronic, and a hybrid of both. Physical greeting card invitations are restricted to print-only greeting messages, i.e. text, photos, and artwork, which don't allow the sender to fully express the emotions behind their message. Once the recipient reads the message, the physical greeting card becomes expendable because it has been physically altered by the sender's personalized printed message. Electronic greeting card invitations do not provide the same personal value and cannot be given alongside a physical gift exchange. These types of invitations are mainly used for mass distribution, not personalization. Hybrid greeting card invitations are made with preloaded media content and require users to rely on additional apps and software to gain access to tools. Messaging and editing restrictions, along with additional device tool requirements are the key problems with greeting card invitations.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In aspect of the invention, a system is provided comprising a physical medium; a unique code positioned on the physical medium, wherein the unique code is configured to be scannable by a camera on a smartphone generating a uniform resource locator; and, a computer server having Internet access configured to host a webpage, wherein the webpage is only accessible from the uniform resource locator via scanning the unique code with the camera on the smartphone.

In one embodiment, the physical medium is greeting card. In another embodiment, the physical medium is a face mask. In another embodiment, the physical medium is a garment. In another embodiment, the physical medium is a shoe. In one embodiment, the uniform resource locator has a location tag when scanned based on the geolocation of the smartphone and wherein the smartphone must be within a predetermined vicinity of the location tag to access the webpage. In one embodiment, the webpage is comprised of a social media platform.

In another aspect of the invention, a method is provided, comprising steps: (a) providing a physical medium having a unique code; (b) scanning, via a camera on a first smartphone, the unique code; (c) accessing, via a display on the first smartphone, a webpage prompted by the scanning of the unique code; (d) enabling a first user to add personalized content to the webpage via the first smartphone display; (e) scanning, via a camera on a second smartphone, the unique code; and, (f) accessing, via a display on the second smartphone, the webpage prompted by the scanning of the unique code such that the personalized content can be viewed by a second user.

In one embodiment, the physical medium is a gift card.

In yet another aspect of the invention, a method is provided, comprising steps: (a) providing a physical medium having a unique code; (b) scanning, via a camera on a smartphone, the unique code at a first location; and, (c) accessing at a second location, via a display on the smartphone, a webpage prompted by the scanning of the unique code, wherein the second location must be in a predetermined vicinity to the first location.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a system for personalized message via a physical medium.

Figure 1:
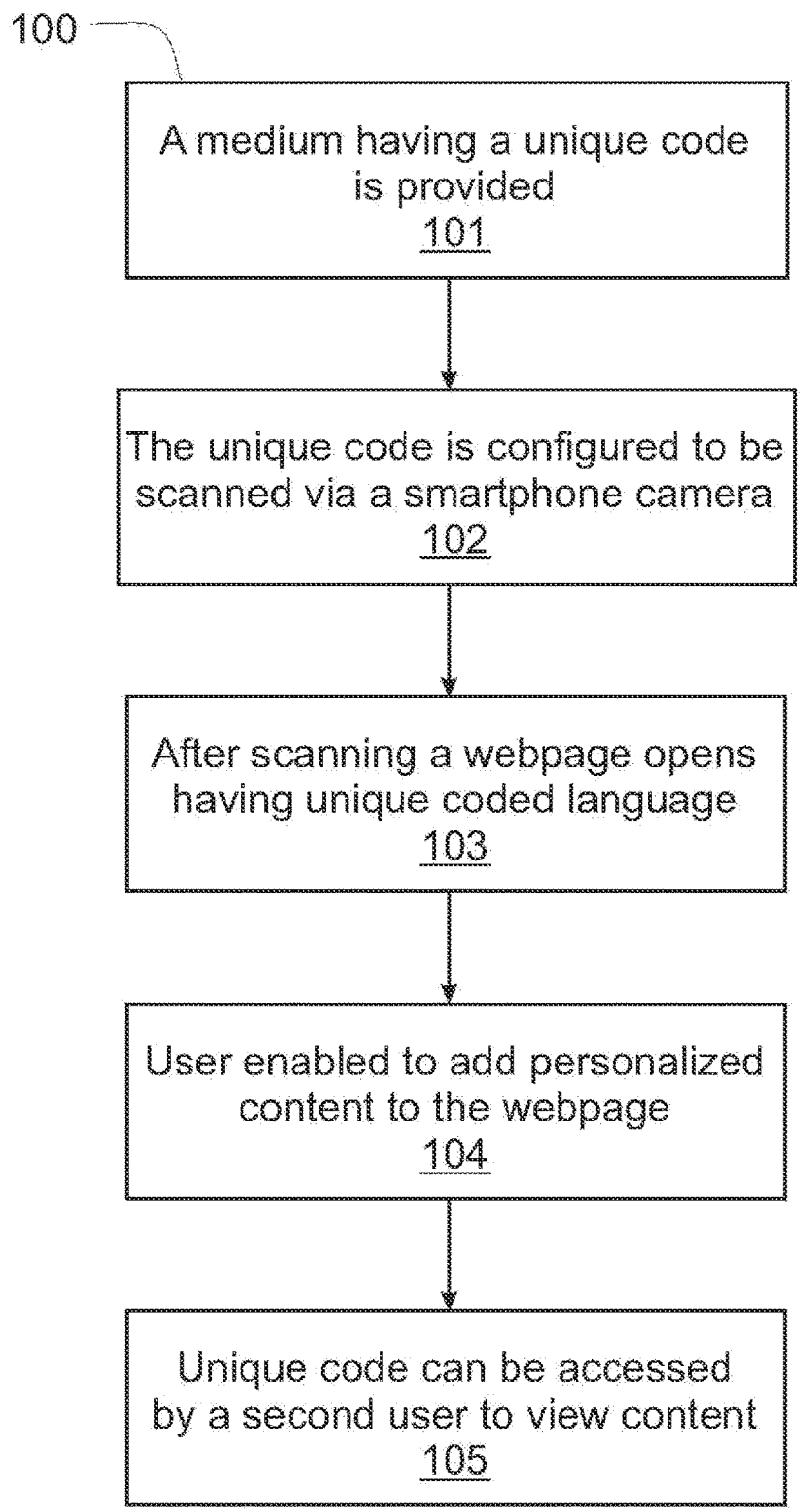
FIG. 1 is a flow diagram illustrating method steps to utilize the system according to an embodiment of the present invention.

FIG. 1 is a flow diagram illustrating method steps 100 to utilize the system according to an embodiment of the present invention. Referring now to FIG. 1, in step 101 a medium having a unique code is provided. Examples of the medium may vary. In one embodiment, the medium is a greeting card. In another embodiment, the medium is a garment, such as a T-shirt. In yet another embodiment, the medium is an accessory, such as a shoe. It should be understood, that the medium may vary and can be any physical article where a code can be printed, such as a hat, mask, letter, flyer, bumper sticker, balloon, etc. The unique code is a scannable code that is configured to link to online content. In one embodiment, the unique code is a QR code. In alternative embodiments, the unique code is a Microsoft® Tag or another type of code, barcode, etc. that is configured to be linked to online content. Preferably, the unique code is scannable by a universal device, such as a smartphone camera. This is preferred to the requirement of a specialized code reader. In that regard, in step 102, the unique code is configured to be scanned via a smartphone camera. The advantages of using a general reader, i.e. smartphone camera, are readily apparent as there is no need for a specialized device.

Next, in step 103, after the unique code is scanned via the smartphone camera, a webpage is configured to open on the smartphone display. In some embodiments, the webpage is a unique URL (Uniform Resource Locator), i.e. each unique code is associated with a unique URL. In step 104, the user may add personalized content to the webpage. In one embodiment, the webpage is a blank page with the ability to post a message. In one embodiment, the message includes text and the ability to upload a file, such as a picture, artwork, video, etc. The user also has the ability to delete, edit, and update the message. Finally, in step 105, the medium may be shared, and the unique code can be accessed by a second user to view the content that was previously updated to the webpage. For example, if the medium was a greeting card, the first user may exchange the greeting card to a second user, wherein the second user may scan the unique code and access the message on their smartphone display.

There are several advantages to the present invention. First, in the medium of greeting cards, the card can be reused, as the message may be updated on the unique webpage. Second, the present invention allows the website (message) to be customized and the giver of the medium can fully express themselves in more detail and content than a greeting card, blank greeting card, or an electronic greeting card. Third, by using the present invention, the message is private and only accessible by the owner of the unique code. Fourth, the present invention does not require any product knowledge or tech savviness by the user to utilize. These are just a few advantages, and it should not be considered a comprehensive list.

Figure 2:
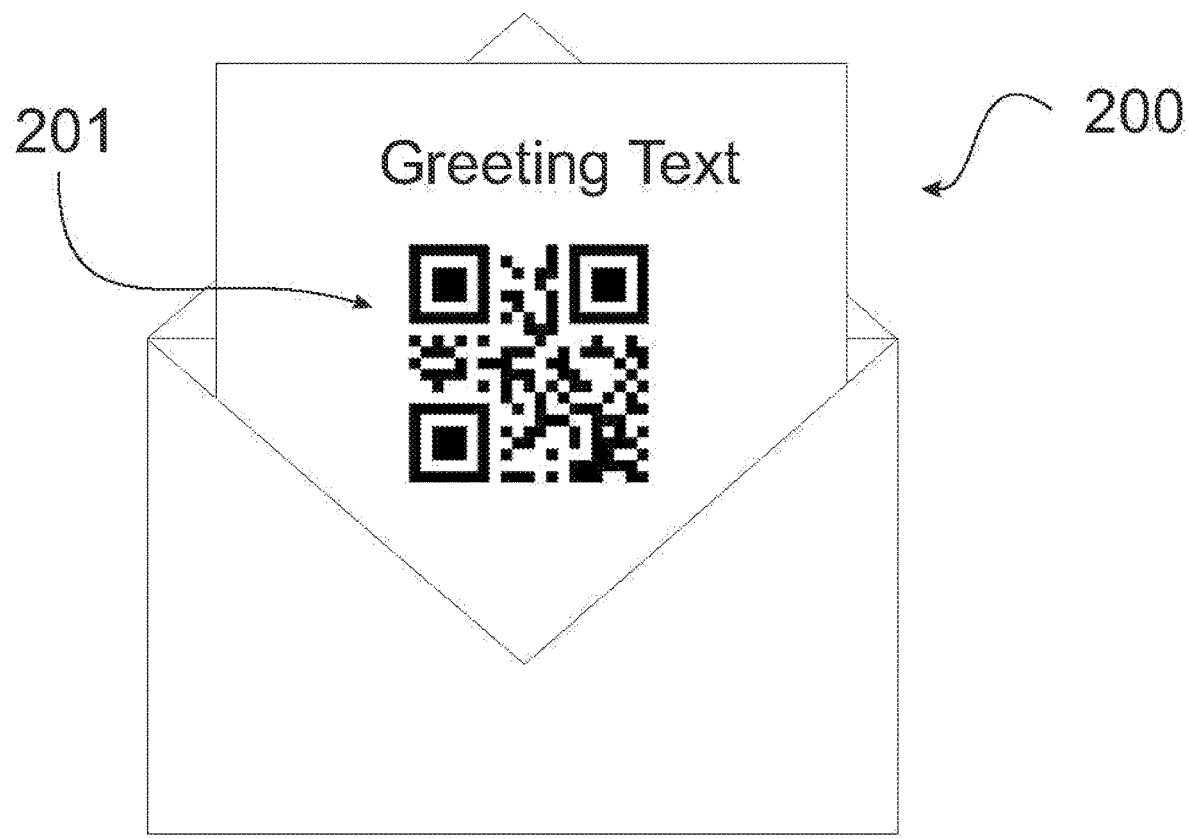
FIG. 2 is an exemplary example of a physical medium of the system according to an embodiment of the present invention.

FIG. 2 is an exemplary example of a physical medium of the system according to an embodiment of the present invention. Referring now to FIG. 2, one example of a physical medium 200 of the system is provided. In this example, a greeting card is presented with optional fixed greeting text. This could say a specific greeting or instructions to scan the card to view the greeting, or alternatively, no text may be provided. The medium 200 includes a unique code 201, such as a QR code. It should be noted that the design of the code may be changed, and the code could appear differently. Any unique design may be used, i.e. the physical design of the scannable codes can be reconfigured. In some embodiments, a custom code tool may be used using different coding language that consists of the same functions of existing codes (QR codes) enabling different designs.

Figure 3:
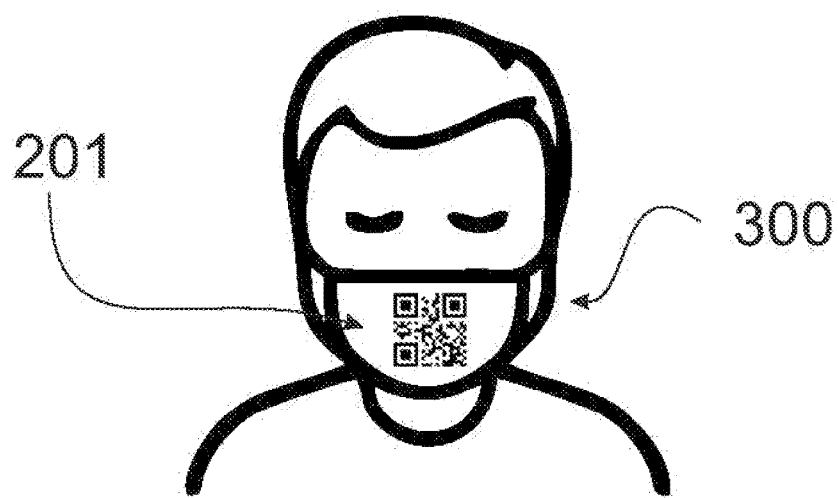
FIG. 3 is an additional exemplary example of a physical medium of the system according to an embodiment of the present invention.

FIG. 3 is an additional exemplary example of a physical medium of the system according to an embodiment of the present invention. Referring now to FIG. 3, another example of a physical medium 300 of the system is provided. In this example, the physical medium is an article of clothing. In one embodiment, the article of clothing is a mask as illustrated, however it should be understood that any type of clothing or accessory a person may wear may be included in the scope of the article of clothing. These may include, but are not limited to, shirts, hats, pants, masks, shoes, belts, dresses, scarfs, hoodies, sweaters, etc. In one embodiment, the medium in this embodiment can function as previously described above. In alternative embodiments, the QR code in the article of clothing medium allows user to follow, engage, and communicate with other users, however the platform for this engagement is only accessible by scanning the QR code printed on the physically item. In some embodiments, the software used in the present invention may prevent a user from accessing it via the URL, such that only access to the platform is via the QR code. It should be understood that any computer equipment and Internet service provider needed to perform the present invention is provided, including but not limited to computers, servers, data storage, ISP, etc.

In one embodiment, the software platform of the present invention includes each unique URL associated with a corresponding unique code or QR code. In some embodiments, the content on each unique URL is intended to be seen and deleted, enabling reuse. In other embodiments, the content is configured to be seen back and forth between users. For example, the owner of a physical medium item, such as shirt, may scan the QR code after purchase and then upload content (text, video, photo, etc.). Then when an additional user scans the QR code, they have can view the previously uploaded content, and in additional may add new content, that can be seen by the original user, or another user that scans the QR code. Advantageously, this enables people to communicate over the Internet with the requirement that they are physically present in approximately to each other at least for enough time for the QR codes to be scanned.

Figure 4:
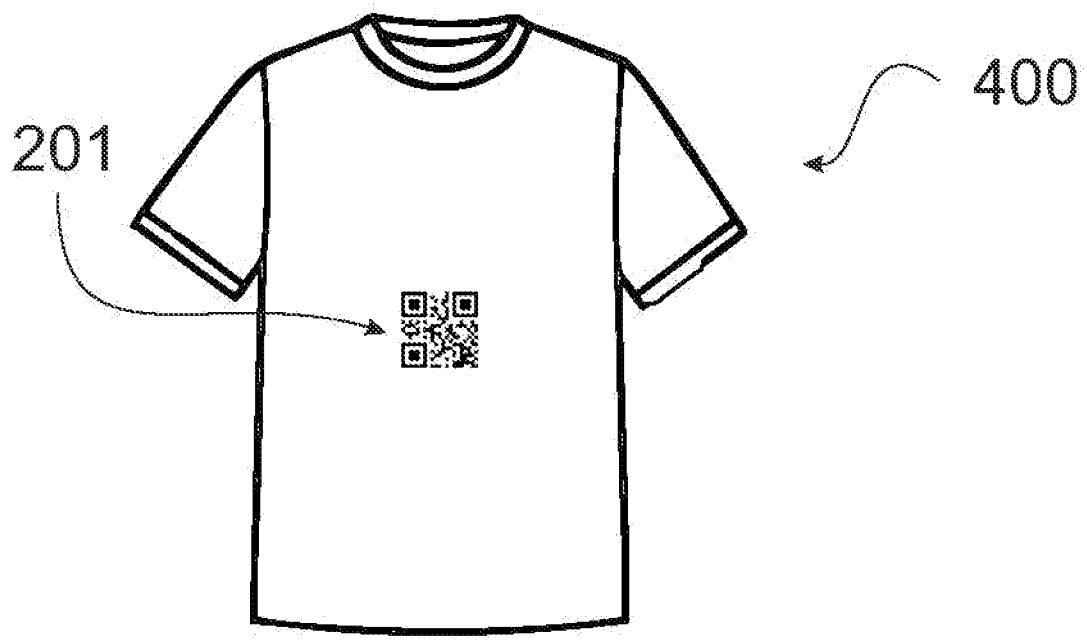
FIG. 4 is an additional exemplary example of a physical medium of the system according to an embodiment of the present invention.
Figure 5:
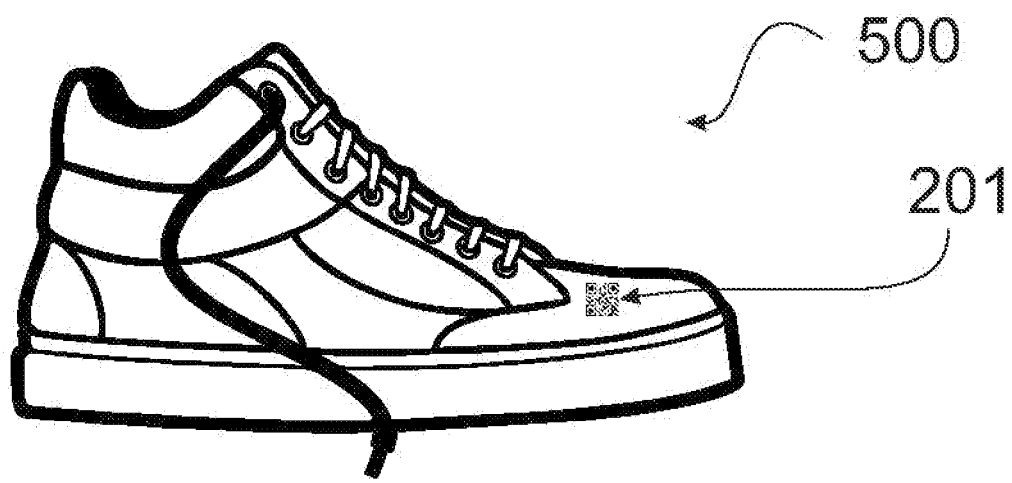
FIG. 5 is an additional exemplary example of a physical medium of the system according to an embodiment of the present invention.

FIGS. 4 and 5 provide further examples of the physical mediums, including a shirt 400 with an offline unique code 201 and a shoe 500 with unique code 201. As previously mentioned, the webpage is only accessible by scanning the unique code. In some embodiments, the webpage is a social media platform where users can engage and collaborate on the platform, wherein each user scanned the offline media (unique code) to access the social media platform.

Figure 7:
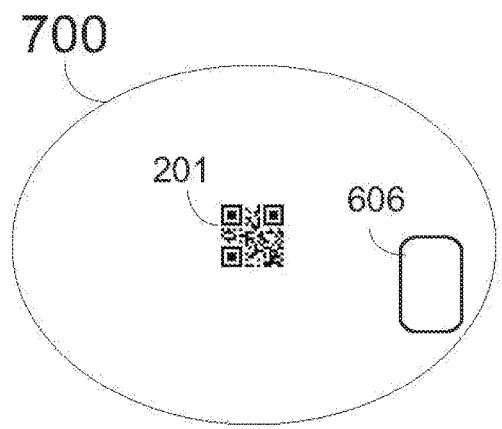
FIG. 7 is a diagram representing a predetermined vicinity between the unique code on a physical medium and the scanning device according to an embodiment of the present invention.

In one embodiment, the unique code is trackable and configurable based on location such that system knows the location of the scan, which can have two factors: (a) the location can be generated and it is indicate on the webpage or social media platform, useful when the physical medium is on a person (mask, shirt, shoes, etc.) as the physical medium is not in a static location; and, (b) if the scanner, or user, is not in the a predetermined vicinity of the location of the unique code, the webpage or social media platform is not accessible. Advantageously, this helps ensure only users that actually scanned the unique code can access the online platform/webpage associated with the unique code. The predetermined vicinity can be a zip code, specific distance or mile radius, 10, 20, 50 miles etc., city, etc. FIG. 7 shows an example of the predetermined vicinity 700 between a smartphone 606 and unique code 201. In other embodiments, the unique code when scan will include a unique tag associated with the scan that is required for accessing the online platform/webpage. It should be understood, there may be other ways to restrict online access to only users that scan the unique code. For example, when scanning the unique code a password may be generated with the scan that enables access to the online platform/webpage. It is a particular object of the present invention to restrict access to the online platform/webpage from users that did not scan the unique code.

Figure 6:
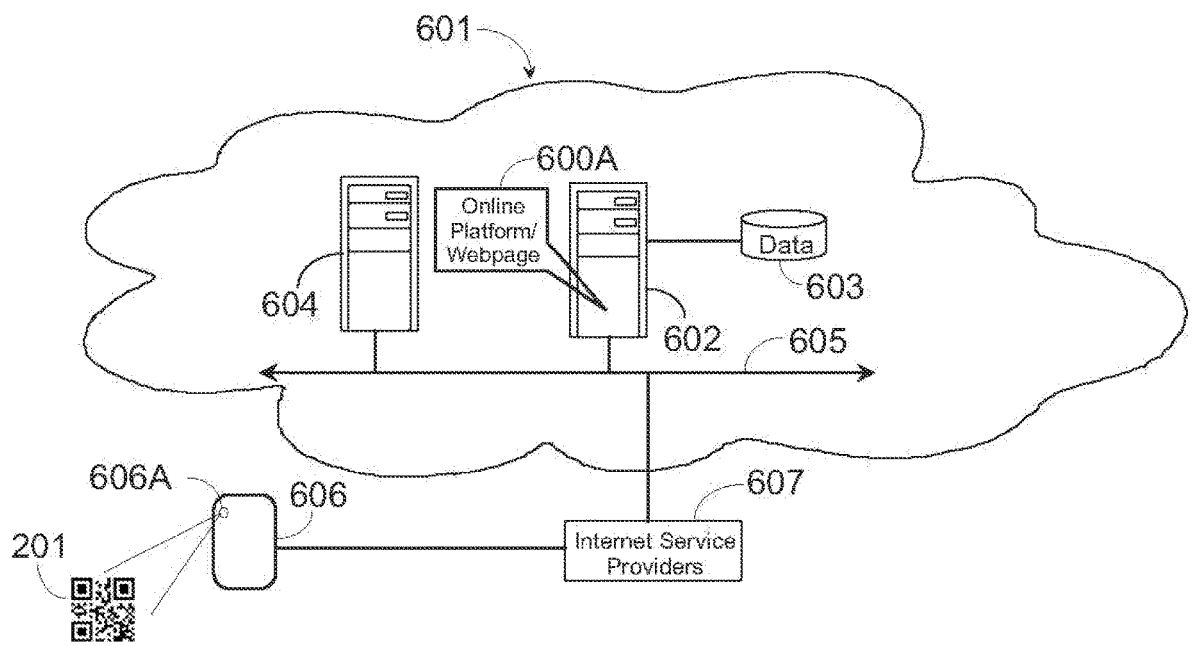
FIG. 6 is a network diagram according to an embodiment of the present invention.

FIG. 6 is an architectural diagram of an Internet 601 computer network system according to an embodiment of the present invention. Referring now to FIG. 6, the Internet-connected system comprises one or more Internet-connected servers 602 configured to host an online platform or webpage 600A from non-transitory media. Server 602 is connected to a data repository 603, which may be any sort of data storage known in the art. The system further comprises a third party Internet-connected server 604 connected to Internet backbone 605. Although one third party Internet-connected server 604 is shown, it is understood that potentially millions of other similar servers are connected to the Internet via Internet backbone 505. A user 606 having a smartphone with a camera 606A is provided, wherein the user is configured to scan a unique code 201 as previously described above. The scan enables the user to access the online platform or webpage 600A as the smartphone is connected to the Internet-connected server via an Internet service provider (ISP) 607.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, reference to "first," "second," "third," and etc. members throughout the disclosure (and in particular, claims) are not used to show a serial or numerical limitation but instead are used to distinguish or identify the various members of the group.

What is claimed is:

1. A system comprising:
   a physical medium;
   a unique code positioned on the physical medium, wherein the unique code is configured to be scannable by a camera on a smartphone generating a uniform resource locator; and,
   a computer server having Internet access configured to host a webpage, wherein the webpage is only accessible from the uniform resource locator via scanning the unique code with the camera on the smartphone;
   wherein the uniform resource locator has a location tag when scanned based on the geolocation of the smartphone and wherein the smartphone must be within a predetermined vicinity of the location tag to access the webpage; and,
   wherein the webpage comprises digital content that is configured to be created, viewed, and edited by any user able to scan the unique code with their smartphone when their smartphone is within the predetermined vicinity of the location tag.

2. The system of claim 1, wherein the physical medium is a reusable greeting card.

3. The system of claim 1, wherein the physical medium is a face mask.

4. The system of claim 1, wherein the physical medium is a garment.

5. The system of claim 1, wherein the physical medium is a shoe.

6. The system of claim 1, wherein the webpage is comprised of a social media platform.

* * * * *